(12) United States Patent
Baek (10) Patent No.: US 8,870,302 B2
(45) Date of Patent: Oct. 28, 2014

(54) HYDRAULIC BRAKE DEVICE AND METHOD FOR CONTROLLING THE SAME

(71) Applicant: Mando Corporation, Gyeonggi-do (KR)

(72) Inventor: Seung Chul Baek, Daegu (KR)

(73) Assignee: Mando Corporation (KR)

( * ) Notice: Subject to any disclaimer, the term of this patent is extended or adjusted under 35 U.S.C. 154(b) by 70 days.

(21) Appl. No.: 13/666,432

(22) Filed: Nov. 1, 2012

(65) Prior Publication Data

US 2013/0106170 A1 May 2, 2013

(30) Foreign Application Priority Data

Nov. 1, 2011 (KR) .................. 10-2011-0112596

(51) Int. Cl.
*B60T 13/68* (2006.01)
*B60T 13/66* (2006.01)
*B60T 13/16* (2006.01)

(52) U.S. Cl.
CPC ............. *B60T 13/166* (2013.01); *B60T 13/662* (2013.01); *B60T 13/686* (2013.01)
USPC .................................................. 303/122.04

(58) Field of Classification Search
USPC ................. 303/3, 10, 122.04–122.05; 73/129
See application file for complete search history.

(56) References Cited

U.S. PATENT DOCUMENTS

| | | | | |
|---|---|---|---|---|
| 6,557,403 | B1 * | 5/2003 | Kerns .............................. | 73/121 |
| 7,076,347 | B2 * | 7/2006 | Lehner et al. ................ | 701/31.1 |
| 7,673,948 | B2 * | 3/2010 | Otomo ....................... | 303/114.1 |
| 8,155,821 | B2 * | 4/2012 | Schubert et al. ............. | 701/30.3 |
| 2011/0277465 | A1 * | 11/2011 | Kim et al. ....................... | 60/591 |

FOREIGN PATENT DOCUMENTS

| | | |
|---|---|---|
| JP | 2004537464 | 12/2004 |
| WO | WO 0234601 A1 * | 5/2002 |

* cited by examiner

*Primary Examiner* — Anna Momper
(74) *Attorney, Agent, or Firm* — Ohlandt, Greeley, Ruggiero & Perle, L.L.P.

(57) ABSTRACT

A hydraulic brake device and a method for controlling the same are disclosed. The disclosed hydraulic brake device determines failure of a booster pressure sensor provided at a hydraulic power unit, using pressure correlation among a master cylinder pressure sensor, a pressure sensor provided at the hydraulic power unit to detect a pressure transferred to a hydraulic pressure controller, and a high pressure accumulator pressure sensor. When there is failure of the booster pressure sensor, the driver is informed of the failure, and a braking operation is carried out, taking into consideration the failure. Accordingly, it may be possible to avoid excessive braking, sudden braking, insufficient braking, etc., and to achieve enhancement in braking sensation and braking force.

6 Claims, 4 Drawing Sheets

HYDRAULIC BRAKE DEVICE AND METHOD FOR CONTROLLING THE SAME

CROSS-REFERENCE TO RELATED APPLICATIONS

This application claims the benefit of Korean Patent Application No. P2011-112596, filed on Nov. 1, 2011 in the Korean Intellectual Property Office, the disclosure of which is incorporated herein by reference.

BACKGROUND

1. Field

Embodiments of the present invention relate to a hydraulic brake device and a method for controlling the same.

2. Description of the Related Art

Hybrid vehicles and electric vehicles are next-generation environmentally friendly vehicles, which include an engine, in particular, an internal combustion engine, and a motor to be driven by electrical energy stored in a battery. Such a vehicle travels through driving of the engine and motor.

In a hybrid vehicle or an electric vehicle, braking is carried out through control of hydraulic pressure of a master cylinder or control of a motor. In order to achieve an enhancement in braking performance in such a vehicle, a booster or active hydraulic boost (AHB) is used.

The AHB is a device to generate a braking force corresponding to a pedal force exerted by a driver by directly supplying a brake fluid charged under high pressure to a booster. The AHB includes a brake actuation unit having a pedal simulator and a master cylinder, and a hydraulic power unit.

The pedal simulator generates reaction force corresponding to a pedal force from the brake pedal depressed by the driver. The hydraulic power unit is charged with a brake fluid under high pressure. In response to the pedal force from the brake pedal, the hydraulic power unit supplies pressure corresponding to the pedal force to the booster, to enable the master cylinder to generate a sufficient pressure.

That is, when the brake pedal is depressed by the driver, the active hydraulic booster supplies the pressure generated from the master cylinder to wheel cylinders. As a result, the wheel cylinders generate braking force, using the pressure supplied form the master cylinder.

The hydraulic power unit is equipped with a pressure sensor to sense a pressure supplied from a high pressure accumulator to a hydraulic pressure controller. A control unit performs a control operation, based on the pressure sensed by the pressure sensor and a target pressure.

That is, the control unit determines a braking degree by detecting a pedal force from the brake pedal depressed by the user, and sets the determined braking degree as a target pressure. Based on the target pressure, the control unit controls a valve included in the hydraulic power unit. The pressure generated in accordance with control of the valve is detected by a pressure sensor included in the hydraulic power unit.

If the output value from the pressure sensor included in the hydraulic power unit is fixed to a value in the vicinity of 0 bar due to failure of the pressure sensor, the pressure difference between the pressure detected by the pressure sensor and the target pressure is continuously generated. As a result, the control unit controls the valve to be opened at an increased opening degree or to be more frequently opened.

In this case, the pressure charged in the hydraulic power unit is completely transferred to the wheels. As a result, there may be severe problems such as excessive braking, sudden braking, insufficient braking, abnormal braking sensation and abnormal braking force.

SUMMARY

Therefore, it is an aspect of the present invention to provide a hydraulic brake device and a method for controlling the same, which are capable of determining failure of a booster pressure sensor provided at a hydraulic power unit, using pressure correlation among a master cylinder pressure sensor, a pressure sensor provided at the hydraulic power unit to detect a pressure transferred to a hydraulic pressure controller, and a high pressure accumulator pressure sensor.

Another aspect of the present invention is to provide a hydraulic brake device and a method for controlling the same, which are capable of determining whether failure of a pressure sensor provided at a hydraulic power unit to detect a pressure transferred to a hydraulic pressure controller, using pressure correlation between a master cylinder pressure sensor and the pressure sensor.

Additional aspects of the invention will be set forth in part in the description which follows and, in part, will be obvious from the description, or may be learned by practice of the invention.

In accordance with one aspect of the present invention, a hydraulic brake device includes a brake actuation unit to generate a target pressure corresponding to a pedal force from a brake pedal, the brake actuation unit including the brake pedal, a master cylinder, a booster, a reservoir, and a wheel cylinder, a hydraulic power unit to supply, to the booster, a brake fluid in an amount corresponding to the pedal force from the brake pedal such that the master cylinder generates the target pressure, the hydraulic power unit including a high pressure accumulator charged with the brake fluid under high pressure, a first pressure sensor to sense a pressure of the high pressure accumulator, and a second sensor to sense a pressure of the booster, a third pressure sensor to sense a pressure of the brake fluid supplied from the master cylinder to the wheel cylinder, and a control unit to control the hydraulic power unit, for generation of the target pressure, the control unit determining failure of the second pressure sensor, using correlation of pressure data from at least two of the first, second and third pressure sensors.

The hydraulic brake device may further include a hydraulic pressure controller to control the pressure of the brake fluid supplied from the master cylinder to the wheel cylinder.

The hydraulic power unit may further include a cut valve to control supply of the brake fluid from the reservoir, a pump to discharge the brake fluid from the reservoir to the high pressure accumulator through a pumping operation thereof, an apply valve to be opened when the brake pedal is depressed, the apply valve controlling supply of the brake fluid to the booster in an opened state thereof, and a release valve to be opened when depression of the brake pedal is released, the release valve controlling supply of the brake fluid to the reservoir in an opened state thereof.

The control unit may determine that there is failure of the second pressure sensor when the pressure sensed by the second pressure sensor is not increased under a condition that the pressure sensed by the first pressure sensor is decreased.

The control unit may determine that there is failure of the second pressure sensor when a pressure difference between the pressure sensed by the second pressure sensor and the pressure sensed by the third pressure sensor is greater than a predetermined pressure.

The control unit may determine that there is failure of the second pressure sensor when the pressure sensed by the third pressure sensor is higher than a first level of the target pressure, and the pressure sensed by the second pressure sensor is lower than a second level of the target pressure.

The first level of the target pressure may be lower than the second level of the target pressure.

In accordance with another aspect of the present invention, a method for controlling a hydraulic brake device includes controlling closing of a cut valve included in a hydraulic power unit and opening of an apply valve included in the hydraulic power unit when a brake pedal is depressed, to supply, to a booster, a brake fluid stored under high pressure in a high pressure accumulator included in the hydraulic power unit, controlling a hydraulic pressure controller such that the brake fluid supplied from a master cylinder to the booster is supplied to a wheel cylinder, for execution of braking, sensing a pressure of the high pressure accumulator by a first pressure sensor, sensing a pressure of the booster by a second pressure sensor, sensing a pressure of the master cylinder by a third pressure sensor, and determining failure of the second pressure sensor, based on correlation of at least two of the pressure of the high pressure accumulator sensed by the first pressure sensor, the pressure of the booster sensed by the second pressure sensor and the pressure of the master cylinder sensed by the third pressure sensor, and controlling the hydraulic pressure power unit and the hydraulic pressure controller, based on a result of the determination as to failure of the second pressure sensor.

The determining failure of the second pressure sensor may include determining whether the pressure sensed by the first pressure sensor decreases, determining whether the pressure sensed by the second pressure sensor increases upon determining that the pressure sensed by the first pressure sensor decreases, and determining that there is failure of the second pressure sensor upon determining that the pressure sensed by the second pressure sensor increases.

The determining failure of the second pressure sensor may include calculating a pressure difference between the pressure sensed by the second pressure sensor and the pressure sensed by the third pressure sensor, determining whether the calculated pressure difference is greater than a predetermined pressure, and determining that there is failure of the second pressure sensor upon determining that the calculated pressure difference is greater than the predetermined pressure.

The determining failure of the second pressure sensor may include determining whether the pressure sensed by the third pressure sensor is higher than a first level of a target pressure, determining whether the pressure sensed by the second pressure sensor is lower than a second level of the target pressure upon determining that the pressure sensed by the third pressure sensor is higher than the first level of the target pressure, and determining that there is failure of the second pressure sensor upon determining that the pressure sensed by the second pressure sensor is lower than the second level of the target pressure.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the preferred embodiments of the present invention, examples of which are illustrated in the accompanying drawings.

Figure 1:
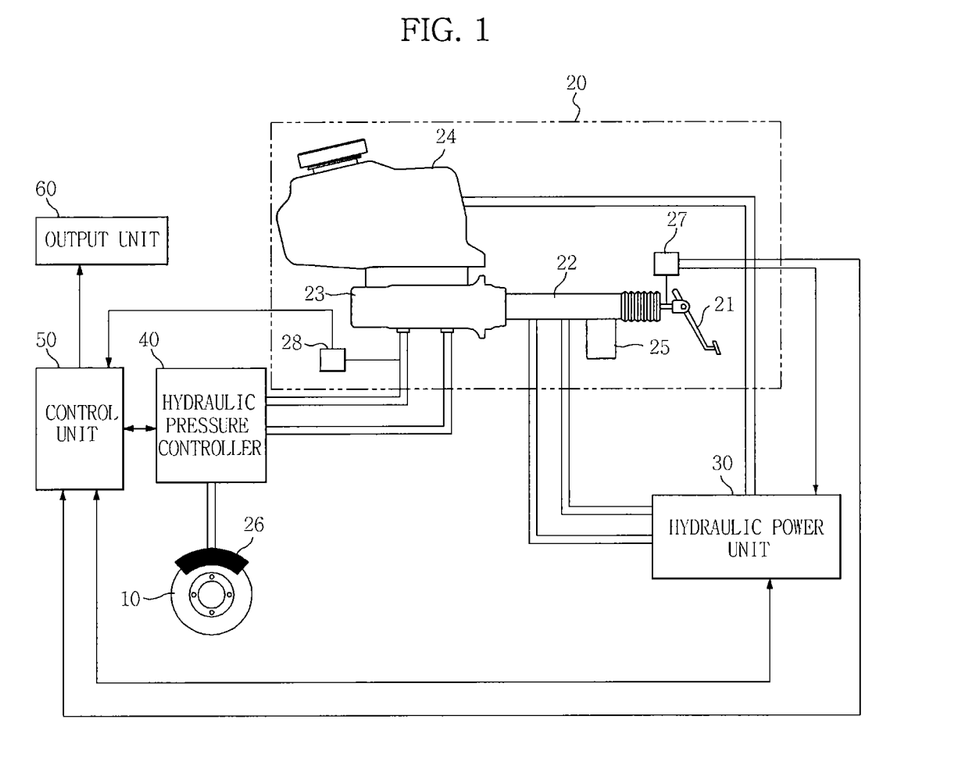
FIG. 1 is a diagram illustrating a configuration of a hydraulic brake device according to an exemplary embodiment of the present invention.
Figure 2:
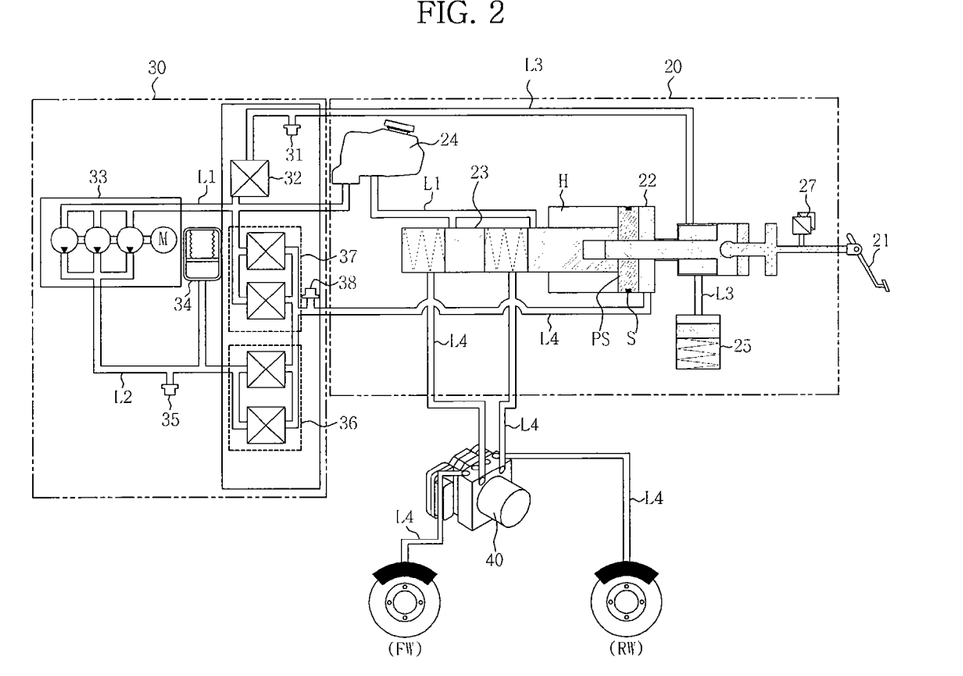
FIG. 2 is a diagram illustrating a detailed configuration of a hydraulic power unit included in the hydraulic brake device according to the illustrated embodiment.
Figure 3:
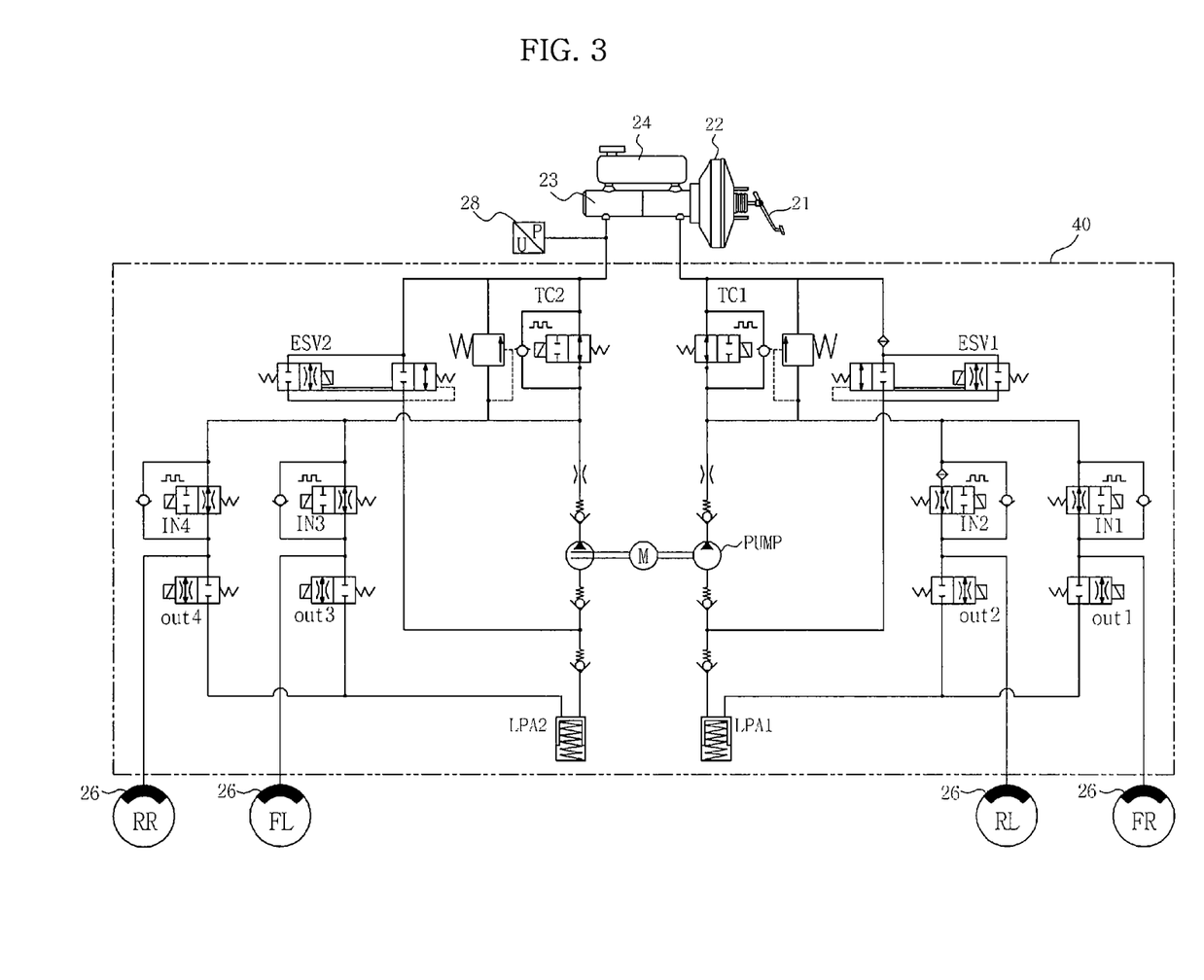
FIG. 3 is a diagram illustrating a detailed configuration of a hydraulic pressure controller included in the hydraulic brake device according to the illustrated embodiment.

FIG. 1 is a diagram illustrating a configuration of a hydraulic brake device according to an exemplary embodiment of the present invention. FIG. 2 is a diagram illustrating a detailed configuration of a hydraulic power unit included in the hydraulic brake device according to the illustrated embodiment. FIG. 3 is a diagram illustrating a detailed configuration of a hydraulic pressure controller included in the hydraulic brake device according to the illustrated embodiment.

In the illustrated embodiment, the hydraulic brake device is an active hydraulic booster (AHB) including a brake actuator and a hydraulic power unit.

As shown in FIG. 1, the hydraulic brake device includes rotatable wheels 10 provided at front, rear and opposite sides of a vehicle, a brake actuation unit 20 to enable generation of a target braking force corresponding to a pedal force from a brake pedal 21, and a hydraulic power unit 30 charged with a brake fluid under high pressure. The hydraulic power unit 30 supplies, to a booster 22, the brake fluid in an amount corresponding to a pedal force from the brake pedal 21, to enable generation of a sufficient pressure in a master cylinder 23. The hydraulic brake device also includes a hydraulic pressure controller 40 to increase or decrease hydraulic actuation force supplied from the master cylinder 23 to wheel cylinders 26, for pressure control, a control unit 50 to enable generation of a hydraulic braking force equal to the target braking force corresponding to the pedal force by the driver by determining failure of a pressure sensor included in the hydraulic power unit 30, and controlling the hydraulic power unit 30 and hydraulic pressure controller 40, based on the result of the determination, and an output unit 60 to output information as to failure of the pressure sensor.

Hereinafter, configurations of the constituent elements of the hydraulic brake device will be described in detail.

As shown in FIGS. 1 and 2, the brake actuation unit 20 includes the brake pedal 21, the booster 22, and the master cylinder 23. When the brake pedal 21 is depressed by the driver, the brake actuation unit 20 is actuated for braking of the vehicle. The booster 22 boosts the pedal force from the brake pedal 21. The master cylinder 23 generates hydraulic pressure in accordance with the boosted force from the booster 22. The brake actuation unit 20 also includes a reservoir 24 connected to the master cylinder 23 via a hydraulic line L1, to store a brake fluid, a pedal simulator 25 connected to the hydraulic power unit 30 via a hydraulic line L3, to generate reaction force corresponding to the pedal force from the brake pedal 21 depressed by the driver. The wheel cylinders 26 are also included in the brake actuation unit 20. Each wheel cylinder 26 converts hydraulic actuation force supplied from the master cylinder 23 via a hydraulic line L4 into mechanical force. The brake actuation unit 20 further includes a pedal stroke detector 27 to detect a mechanical motion of the brake pedal 21 (brake pedal position), namely, a pedal stroke, and a pressure sensor 28 (hereinafter, referred to as a "third pressure sensor") to sense the pressure of the master cylinder 23.

Through the hydraulic line L1, a low pressure brake fluid flows.

The booster 22 includes a housing H to define an outer appearance of the booster 22 and to generate boosted force, a piston PS disposed in the housing H, to move in accordance with depression of the brake pedal 21, and a seal S provided at the piston PS, to secure sealing between the booster 22 and the master cylinder 23.

As shown in FIG. 2, the hydraulic power unit 30 includes a pedal simulator pressure sensor 31 arranged in the hydraulic line L3 between the reservoir 24 and the pedal simulator 25, to detect the pressure of the pedal simulator 25, a cut valve 32 arranged in the hydraulic line L3 between the reservoir 24 and the pedal simulator 25, to control supply of the brake fluid between the reservoir 24 and the pedal simulator 25, and a pump 33 to discharge the brake fluid from the reservoir 24 through pumping operation thereof. The hydraulic power unit 30 also includes a high pressure accumulator 34 to temporarily store the brake fluid discharged from the pump 33 after reducing noise and pulsation of the brake fluid, a high pressure accumulator pressure sensor 35 (hereinafter, referred to a "first sensor") arranged in a hydraulic line L2 between the pump 33 and the high pressure accumulator 34, to sense the pressure of the high pressure accumulator 34, and an apply valve 36 arranged between the hydraulic line L2 connected to the hydraulic accumulator 34 and the hydraulic line L4 connected to the booster 22, to control supply of the brake fluid to the booster 22 in an opened state thereof. The apply valve 36 is opened when the brake pedal 21 is depressed. The hydraulic power unit 30 further includes a release valve 37 arranged between the hydraulic line L1 connected to the reservoir 24 and the hydraulic line L4 connected to the booster 22, to control supply of brake fluid to the reservoir 24 in an opened state thereof, and a booster pressure sensor 38 (hereinafter, referred to as a "second pressure sensor") to sense the pressure of the booster 22. The release valve 37 is opened when depression of the brake pedal 21 is released.

Through the hydraulic line L2, a high pressure brake fluid flows.

As shown in FIG. 3, the hydraulic pressure controller 40 is connected to the master cylinder 23 via the hydraulic line L4 (FIG. 2). Accordingly, the hydraulic pressure controller 40 receives the brake fluid supplied from the master cylinder 23, and supplies the received brake fluid to each wheel cylinder 26 after controlling the hydraulic pressure of the brake fluid.

The hydraulic pressure controller 40 includes hydraulic pumps PUMP to pump the brake fluid from the reservoir 24 and to supply the pumped brake fluid to respective wheel cylinders 26, low pressure accumulators LPA1 and LPA2 to temporarily store respective brake fluids pumped by the hydraulic pumps PUMP, and solenoid valves TC1, TC2, ESV1, ESV2, IN1 to IN4, and out1 to out4 to supply the brake fluid supplied from the master cylinder 23 to the wheel cylinders 26 or to return the brake fluid to the reservoir 24.

In more detail, the master cylinder 23 includes two chambers. The solenoid valve TC1, which is a normally open traction control valve, is arranged in a hydraulic line connecting the first chamber of the master cylinder 23 to the wheel cylinders 26 respectively installed at the front right wheel FR and rear left wheel RL. The normally open traction control valve TC1 controls transfer of the brake fluid from the master cylinder 23 to the wheel cylinder 26.

Also, the solenoid valve TC2, which is a normally open traction control valve, is arranged in a hydraulic line connecting the second chamber of the master cylinder 23 to the wheel cylinders 26 respectively installed at the front left wheel FL and rear right wheel RR. The normally open traction control valve TC2 controls transfer of the brake fluid from the master cylinder 23 to the wheel cylinder 26 at each of the wheels FL and RR.

The solenoid valves IN1 and IN2, which are normally open, are arranged in a hydraulic line between the normally open traction control valve TC1 and the wheel cylinder 26 installed at the rear left wheel RL and in a hydraulic line between the normally open traction control valve TC1 and the wheel cylinder 26 installed at the front right wheel FR, respectively. Also, the solenoid valves IN3 and IN4, which are normally open, are arranged in a hydraulic line between the normally open traction control valve TC2 and the wheel cylinder 26 installed at the rear right wheel RR and in a hydraulic line between the normally open traction control valve TC2 and the wheel cylinder 26 installed at the front left wheel FL, respectively.

The solenoid valves out1 and out2, which are normally closed, are arranged at outlets of the wheel cylinders 26 at the wheels RL and FR, respectively. Also, the solenoid valves out3 and out4, which are normally closed, are arranged at outlets of the wheel cylinders 26 at the wheels RR and FL, respectively. The low pressure accumulator LPA2 is connected to the outlets of the normally closed solenoid valves out3 and out4, to temporarily store the brake fluid discharged from the wheel cylinders 26 of the wheels RR and FL.

The hydraulic pumps PUMP operate to pump the brake fluid stored in the low pressure accumulator LPA1 and the brake fluid stored in the low pressure accumulator LPA2, to forcibly return the pumped brake fluid to corresponding ones of the wheel cylinders 26, respectively. A single hydraulic motor is connected to the two hydraulic pumps PUMP.

Meanwhile, the solenoid valves ESV1 and ESV2, which are normally closed electronic shuttle valves, are arranged in an auxiliary hydraulic line between an inlet of one hydraulic pump PUMP and one chamber of the master cylinder 23 and in an auxiliary hydraulic line between an inlet of the other hydraulic pump PUMP and the other chamber of the master cylinder 23, respectively.

Accordingly, when the normally closed electronic shuttle valves ESV1 and ESV2 are opened, the auxiliary hydraulic line between the master cylinder 23 and each hydraulic pump PUMP is opened. On the other hand, when the normally closed electronic shuttle valves ESV1 and ESV2 are closed, the auxiliary hydraulic line between the master cylinder 23 and each hydraulic pump PUMP is closed.

In each of the normally open valves, a valve passage of the valve is normally opened until current flows through the valve, and is closed when current flows through the valve. On the other hand, in each of the normally closed valves, a valve passage of the valve is normally closed until current flows through the valve, and is opened when current flows through the valve.

When the hydraulic braking force of the wheel cylinders 26 is to be increased, the hydraulic pressure controller 40, which has the above-described configuration, opens the normally open solenoid valves while driving the hydraulic pumps PUMP in accordance with a command from the control unit 50, thereby supplying the brake fluid from the reservoir 24 or low pressure accumulators LPA1 and LPA2 via the normally open solenoid valves. Thus, the pressure of each wheel cylinder 26 is increased. In this case, the brake fluid from the reservoir 24 may be directly supplied to the wheel cylinders 26 via the hydraulic line connected between the reservoir 24 and the hydraulic pumps PUMP without passing through the hydraulic lines connected to the master cylinder 23.

When the hydraulic braking force of the wheel cylinders 26 is to be decreased, the hydraulic pressure controller 40 opens the normally closed solenoid valves while stopping the hydraulic pumps PUMP in accordance with a command from the control unit 50, thereby returning the brake fluid from the wheel cylinders 26 to the reservoir 24 via the normally closed solenoid valves. Thus, the pressure of each wheel cylinder 26 is decreased. In this case, the brake fluid discharged from the wheel cylinders 26 may be temporarily stored in the low pressure accumulators LPA1 and LPA2.

When the pressure of each wheel cylinder 26 reaches an appropriate pressure in accordance with the above-described pressure increase or decrease, the hydraulic pressure controller 40 closes the normally open solenoid valves or normally closed solenoid valves in accordance with a command from the control unit 50, to maintain the current pressure of each wheel cylinder 26.

The control unit 50 determines a target braking degree corresponding to a pedal force by the driver, based on the pressure of the pedal simulator 25 sensed by the pedal simulator pressure sensor 31 and the stroke of the brake pedal 21 detected by the pedal stroke detector 27. Thereafter, the control unit 50 controls the hydraulic power unit 30 and hydraulic pressure controller 40, to acquire the determined target braking degree.

The target pressure of the master cylinder 23 is determined in accordance with the target braking degree.

When the brake fluid from the booster 22 is supplied to the master cylinder 23, the control unit 50 controls the hydraulic pressure controller 40 such that the brake fluid is supplied to the wheel cylinders 26 after being increased or decreased in pressure. The brake fluid, which is supplied from the booster 33 to the master cylinder 23, is controlled in pressure by the hydraulic power unit 30, for optimal braking performance.

During travel of the vehicle, the control unit 50 controls the cut valve 32, to open the cut valve 32, and controls the apply valve 36 and release valve 37, to close the apply valve 36 and release valve 37. The control unit 50 also controls the pump 33, to pump the brake fluid from the reservoir 24. The pumped brake fluid is supplied to the high pressure accumulator 34 and, as such, the high pressure accumulator 34 is charged with the brake fluid.

In more detail, the control unit 50, which executes a control operation to obtain optimal braking performance, controls the cut valve 32 upon braking, to close the cut valve 32. In this case, the control unit 50 also controls the apply valve 36, to open the apply valve 36. Accordingly, the high pressure brake fluid stored in the high pressure accumulator 34 is supplied to the booster 22 via the apply valve 36.

The brake fluid supplied to the booster 22 is then transferred to the wheel cylinders 26 via the hydraulic pressure controller 40. When the brake fluid passes through the hydraulic pressure controller 40, the pressure of the brake fluid is sensed by the third pressure sensor 28.

When depression of the pedal 21 by the driver is released, the control unit 50 controls the cut valve 32, to close the cut valve 32. In this case, the control unit 50 also controls the release valve 37, to open the release valve 37. Accordingly, the brake fluid from the booster 22 is supplied to the reservoir 24 via the release valve 37. In this case, the amount of the brake fluid supplied to the master cylinder 25 is decreased.

The control unit 50 receives high press accumulator pressure data from the first pressure sensor 35 and booster pressure data from the second pressure sensor 38, thereby monitoring the pressure of the high pressure accumulator 34 and the pressure of the booster 22. Then, the control unit 50 determines failure of the second pressure sensor 38, based on correlation of at least two of the high pressure accumulator pressure data from the first pressure sensor 35, the booster pressure data from the second pressure sensor 38, and the master cylinder pressure data from the third pressure sensor 28.

The correlation between the hydraulic power unit and the hydraulic pressure controller in the above-described hydraulic brake device is as follows.

When the brake pedal 21 is depressed by the driver, that is, when a pedal force is applied to the brake pedal 21, data as to the stroke of the brake pedal 21, namely, pedal travel data, is increased, and the target pressure is increased in accordance with depression of the brake pedal 21. Also, for enhancement in braking performance, the apply valve 36 is opened to cause the brake fluid from the high pressure accumulator 34 to be supplied to the booster 22. As a result, the pressure of the high pressure accumulator 34 is decreased. Meanwhile, the pressure of the master cylinder 23 is increased because the brake fluid is supplied to the wheel cylinders 26 such that the pressure of each wheel cylinder 26 follows the target pressure. In this case, the master cylinder 23 supplies the brake fluid received from the high pressure accumulator 34 to the wheel cylinders 26.

In this case, the pressure decrease degree of the high pressure accumulator 34 is similar to the pressure increase degree of the master cylinder 23, and the pressures of the booster 22 and master cylinder 23 are increased to the target pressure.

On the other hand, when depression of the brake pedal 21 by the driver is released, the pedal travel data of the brake pedal 21 is decreased, and the target pressure is decreased in accordance with depression release of the brake pedal 21. Also, the apply valve 36 is closed, and the release valve 37 is opened. As a result, supply of the brake fluid from the high pressure accumulator 34 to the booster 22 is shut off. In this case, accordingly, the pressure of the high pressure accumulator 34 is increased. Also, the brake fluid is supplied to the wheel cylinders 26 such that the pressure of each wheel cylinder 26 follows the target pressure. Thus, the pressure of the master cylinder 23 is decreased. In this case, the master cylinder 23 supplies the brake fluid received from the booster 22 to the wheel cylinders 26.

The output unit 60 outputs information as to failure of the second pressure sensor 38, to enable the driver to recognize such failure. The output unit 60 may output the information in the form of an image or sound.

Figure 4:
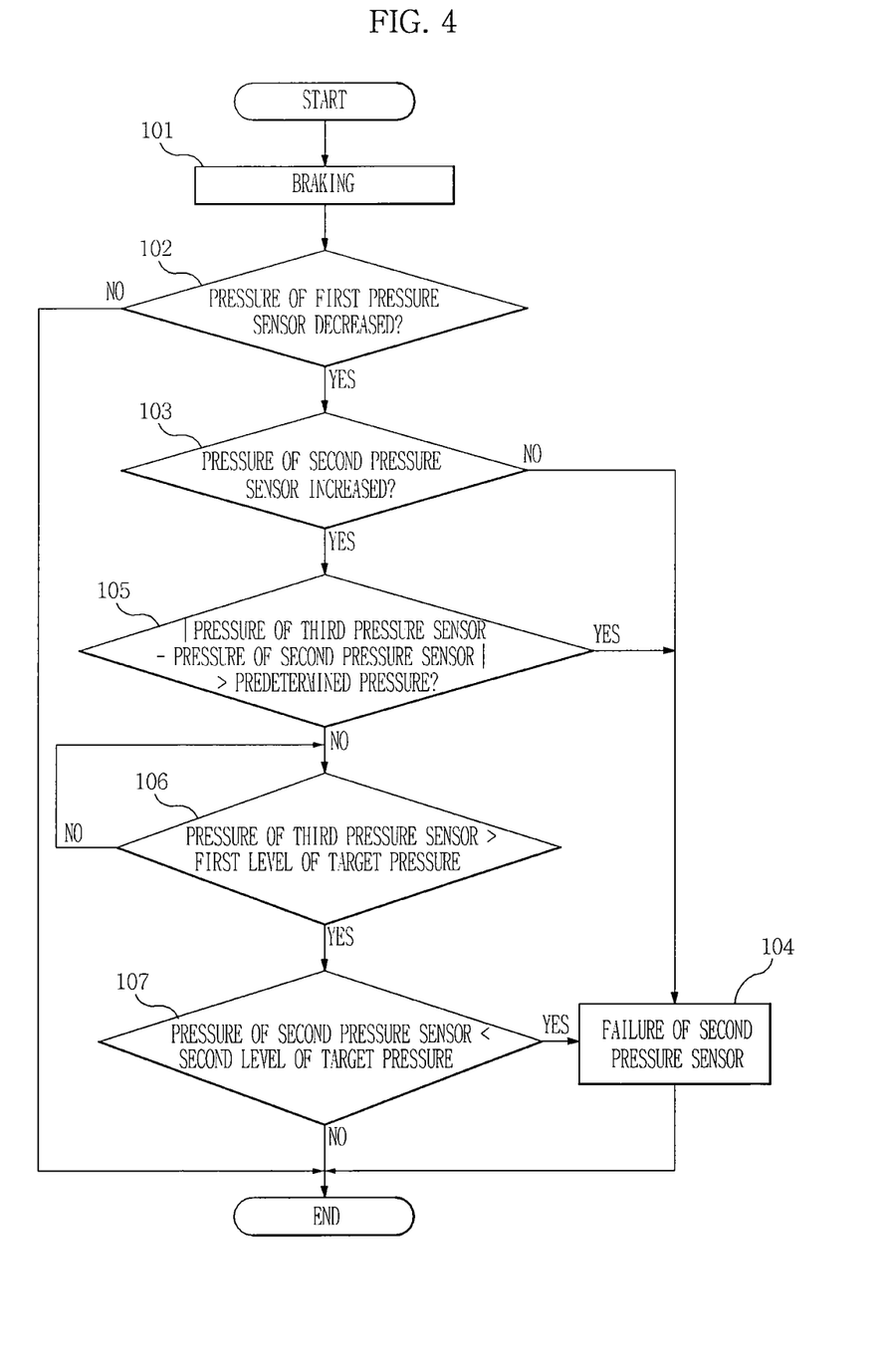
FIG. 4 is a flowchart illustrating control operation of the hydraulic brake apparatus according to the illustrated embodiment.

FIG. 4 is a flowchart illustrating control operation of the hydraulic brake apparatus according to the illustrated embodiment. Hereinafter, the control operation will be described with reference to FIGS. 1 to 3.

During travel of the vehicle, the hydraulic brake device opens the cut valve 32 while closing the apply valve 36 and release valve 37. The hydraulic brake device also periodically drives the pump 33, to pump the brake fluid from the reservoir 24. Accordingly, the high pressure accumulator 34 is charged with the pumped brake fluid.

In order to obtain an enhanced optimal braking performance upon braking the vehicle, the hydraulic braking device controls the hydraulic power unit 30 such that an appropriate hydraulic pressure is generated in the master cylinder 23.

That is, when the brake pedal 21 is depressed by the driver, the hydraulic brake device closes the cut valve 32 while opening the apply valve 36, thereby executing a control operation for active hydraulic booster (AHB) braking (101).

Accordingly, the hydraulic brake device supplies the high pressure brake fluid stored in the high pressure accumulator 34 to the booster 22 via the apply valve 36. The brake fluid supplied to the booster 22 is then supplied to the master cylinder 23. The brake fluid from the master cylinder 23 is supplied to the wheel cylinders 26 after being pressure-controlled by the hydraulic pressure controller 40. Thus, a braking force of the vehicle is generated.

The hydraulic braking device monitors the pressure sensed by the first pressure sensor 35 while executing a braking operation, and determines whether the pressure of the high pressure accumulator 34 sensed by the first pressure sensor 35 is decreased (102).

A method of determining whether the pressure of the high pressure accumulator 34 sensed by the first pressure sensor 35 is decreased is carried out as follows.

First, the pressure of the high pressure accumulator 34 sensed by the first pressure sensor 35 is compared with a first reference pressure, to determine whether the pressure difference between the sensed pressure and the first reference pressure is greater than a predetermined first value. Based on the result of the determination, pressure decrease of the high pressure accumulator 34 from the first reference pressure is determined. In detail, it is determined whether the pressure of the high pressure accumulator 34 has been reduced to a pressure within a pressure range within which failure of the second pressure sensor 38 may occur.

That is, when the pressure difference between the pressure of the high pressure accumulator 34 and the first reference pressure is equal to or less than the predetermined first value, it is determined that the state of the second pressure sensor 38 is normal. On the other hand, when the pressure difference between the pressure of the high pressure accumulator 34 and the first reference pressure is greater than the predetermined first value, it is determined that the pressure of the high pressure accumulator 34 has been reduced to a pressure within the pressure range within failure of the second pressure sensor 38 may occur. In the latter case, the pressure of the booster 22 sensed by the second pressure sensor 38 is monitored.

Accordingly, the hydraulic brake device determines whether the pressure of the booster 22 sensed by the second pressure sensor 38 is increased (103). When it is determined that the pressure of the booster 22 sensed by the second pressure sensor 38 is not increased, it is determined that the second pressure sensor 38 has failed (104).

A method of determining whether the pressure of the booster 22 sensed by the second pressure sensor 38 is increased is carried out as follows.

First, the pressure of the booster 22 sensed by the second pressure sensor 38 is compared with a second reference pressure, to determine whether the pressure difference between the sensed pressure and the second reference pressure is greater than a predetermined second value. Based on the result of the determination, pressure increase of the booster 22 from the second reference pressure is determined.

Here, each of the first reference pressure and second reference pressure is a pressure generated during a control operation for AHB braking.

On the other hand, when the pressure difference between the pressure of the booster 22 sensed by the second pressure sensor 38 and a second reference pressure is equal to or less than the predetermined second value, it is determined whether the second pressure sensor 38 has failed, using the correlation between the pressure of the booster 22 sensed by the second pressure sensor 38 and the pressure of the master cylinder 23 sensed by the third pressure sensor 28.

In more detail, the pressure difference between the pressure of the booster 22 sensed by the second pressure sensor 38 and the pressure of the master cylinder 23 sensed by the third pressure sensor 28 is calculated, to determine whether the calculated pressure difference is greater than a predetermined pressure (105). When the calculated pressure difference is greater than the predetermined pressure, it is determined that the second pressure sensor 38 has failed (104).

On the other hand, when the pressure difference between the pressure of the booster 22 sensed by the second pressure sensor 38 and the pressure of the master cylinder 23 sensed by the third pressure sensor 28 is equal to or less than the predetermined pressure, it is determined whether the pressure of the master cylinder 23 sensed by the third pressure sensor 28 is higher than a first level of the target pressure (target pressure*a %) (106).

When the pressure of the master cylinder 23 sensed by the third pressure sensor 28 is higher than the first level of the target pressure, it is then determined whether the pressure of the booster 22 sensed by the second pressure sensor 38 is lower than a second level of the target pressure (target pressure*b %) (107).

When the pressure of the booster 22 sensed by the second pressure sensor 38 is equal to or higher than the second level of the target pressure (target pressure*b %) under the condition that the pressure of the master cylinder 23 sensed by the third pressure sensor 28 is higher the first level of the target pressure (target pressure*a %), it is determined that the state of the second pressure sensor 38 is normal.

On the other hand, when the pressure of the booster 22 sensed by the second pressure sensor 38 is lower than the second level of the target pressure (target pressure*b %) under the condition that the pressure of the master cylinder 23 sensed by the third pressure sensor 28 is higher than the first level of the target pressure (target pressure*a %), it is determined that the second pressure sensor 38 has failed (104).

Here, the first level of the target pressure is lower than the second level of the target pressure.

For example, when the first level of the target pressure is 1% of the target pressure, the second level of the target pressure is 2% of the target pressure. On the other hand, when the first level of the target pressure is 3% of the target pressure, the second level of the target pressure is 4% of the target pressure.

When it is determined that the second pressure sensor 38 has failed, the hydraulic brake device executes a braking operation, taking into consideration the failure of the second pressure sensor 38. In this case, the hydraulic brake device also outputs information as to the failure of the second pressure sensor 38 through the output unit 60, in order to enable the driver to easily recognize the failure.

When depression of the pedal 21 by the driver is released, the hydraulic brake device opens the release valve 37 under the condition that the cut valve 32 is maintained in a closed state, and supplies the brake fluid from the booster 212 to the reservoir 24 via the release valve 37. In this case, the amount of the brake fluid supplied to the master cylinder 23 is decreased. The amount of brake fluid corresponding to the decreased amount of brake fluid is supplied to the wheel cylinder 26.

As apparent from the above description, in accordance with the aspects of the present invention, failure of a booster pressure sensor provided at a hydraulic power unit is determined, using pressure correlation among a master cylinder pressure sensor, a pressure sensor provided at the hydraulic power unit to detect a pressure transferred to a hydraulic pressure controller, and a high pressure accumulator pressure sensor. When failure of the booster pressure sensor is detected, the driver is informed of the failure, and a braking operation is carried out, taking into consideration the failure. Accordingly, it may be possible to avoid excessive braking, sudden braking, insufficient braking, etc., and to achieve enhancement in braking sensation and braking force.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A hydraulic brake device comprising:
    a brake actuation unit to generate a target pressure corresponding to a pedal force from a brake pedal, the brake actuation unit comprising the brake pedal, a master cylinder, a booster, a reservoir, and a wheel cylinder;
    a hydraulic power unit to supply, to the booster, a brake fluid in an amount corresponding to the pedal force from the brake pedal such that the master cylinder generates the target pressure, the hydraulic power unit comprising a high pressure accumulator charged with the brake fluid under high pressure, a first pressure sensor to sense a pressure of the high pressure accumulator, and a second sensor to sense a pressure of the booster;
    a third pressure sensor to sense a pressure of the brake fluid supplied from the master cylinder to the wheel cylinder; and
    a control unit to control the hydraulic power unit, for generation of the target pressure, the control unit determining failure of the second pressure sensor, using correlation of pressure data from the first, second and third pressure sensors, under at least one of the following conditioms:
    when the pressure sensed by the second pressure sensor is not increased when the pressure sensed by the first pressure sensor is decreased;
    when a difference between the pressure sensed by the second pressure sensor and the pressure sensed by the third pressure sensor is greater than a predetermined pressure difference; or
    when the pressure sensed by the third pressure sensor is higher than a first level of the target pressure, and the pressure sensed by the second pressure sensor is lower than a second level of the target pressure.

2. The hydraulic brake device according to claim 1, further comprising:
    a hydraulic pressure controller to control the pressure of the brake fluid supplied from the master cylinder to the wheel cylinder.

3. The hydraulic brake device according to claim 1, wherein the hydraulic power unit further comprises:
    a cut valve to control supply of the brake fluid from the reservoir;
    a pump to discharge the brake fluid from the reservoir to the high pressure accumulator through a pumping operation thereof;
    an apply valve to be opened when the brake pedal is depressed, the apply valve controlling supply of the brake fluid to the booster in an opened state thereof; and
    a release valve to be opened when depression of the brake pedal is released, the release valve controlling supply of the brake fluid to the reservoir in an opened state thereof.

4. The hydraulic brake device according to claim 1, wherein the first level of the target pressure is lower than the second level of the target pressure.

5. A method for controlling a hydraulic brake device, comprising:
    controlling closing of a cut valve included in a hydraulic power unit and opening of an apply valve included in the hydraulic power unit when a brake pedal is depressed, to supply, to a booster, a brake fluid stored under high pressure in a high pressure accumulator included in the hydraulic power unit;
    controlling a hydraulic pressure controller such that the brake fluid supplied from a master cylinder to the booster is supplied to a wheel cylinder, for execution of braking;
    sensing a pressure of the high pressure accumulator by a first pressure sensor;
    sensing a pressure of the booster by a second pressure sensor;
    sensing a pressure of the master cylinder by a third pressure sensor; and
    determining failure of the second pressure sensor, based on correlation of at least two of the pressures sensed by the first pressure sensor, by the second pressure sensor, and by the third pressure sensor; and
    controlling the hydraulic pressure power unit and the hydraulic pressure controller, based on a result of the determination as to failure of the second pressure sensor,
    wherein the determining step is performed in at least one of the following ways:
    determining whether the pressure sensed by the first pressure sensor decreases, determining whether the pressure sensed by the second pressure sensor increases upon determining that the pressure sensed by the first pressure sensor decrease, and determining that there is failure of the second pressure sensor upon determining that the pressure sensed by the second pressure sensor does not increase;
    calculating a pressure difference between the pressure sensed by the second pressure sensor and the pressure sensed by the third pressure sensor, determining that there is failure of the second pressure sensor upon determining that the calculated pressure difference is greater than the predetermined pressure; or
    determining whether the pressure sensed by the third pressure sensor is higher than a first level of a target pressure, determining whether the pressure sensed by the second pressure sensor is lower than a second level of the target pressure upon determining that the pressure sensed by the third pressure sensor is higher than the first level of the target pressure, and determining that there is failure of the second pressure sensor upon determining that the pressure sensed by the second pressure sensor is lower than the second level of the target pressure.

6. A hydraulic brake device comprising:
    a brake actuation unit, comprising:
        a brake pedal;
        a master cylinder;
        a booster;
        a reservoir; and
        a wheel cylinder, wherein said brake actuation unit generates a target pressure corresponding to a pedal force from a brake pedal;
    a hydraulic power unit, comprising:
        a high pressure accumulator charged with the brake fluid under high pressure;
        a first pressure sensor to sense a pressure of the high pressure accumulator; and
        a second sensor to sense a pressure of the booster, wherein said hydraulic power unit supplies, to the booster, a brake fluid in an amount corresponding to the pedal force from the brake pedal such that the master cylinder generates the target pressure;

a third pressure sensor to sense a pressure of the brake fluid supplied from the master cylinder to the wheel cylinder; and a control unit in communication with the hydraulic power unit and each of the first, second and third pressure sensors, the control unit determining failure of the second pressure sensor under at least one of the following conditions:

when the pressure sensed by the second pressure sensor is not increased when the pressure sensed by the first pressure sensor is decreased;

when a difference between the pressure sensed by the second pressure sensor and the pressure sensed by the third pressure sensor is greater than a predetermined pressure difference; or when the pressure sensed by the third pressure sensor is higher than a first level of the target pressure, and the pressure sensed by the second pressure sensor is lower than a second level of the target pressure.

* * * * *